UNITED STATES PATENT OFFICE.

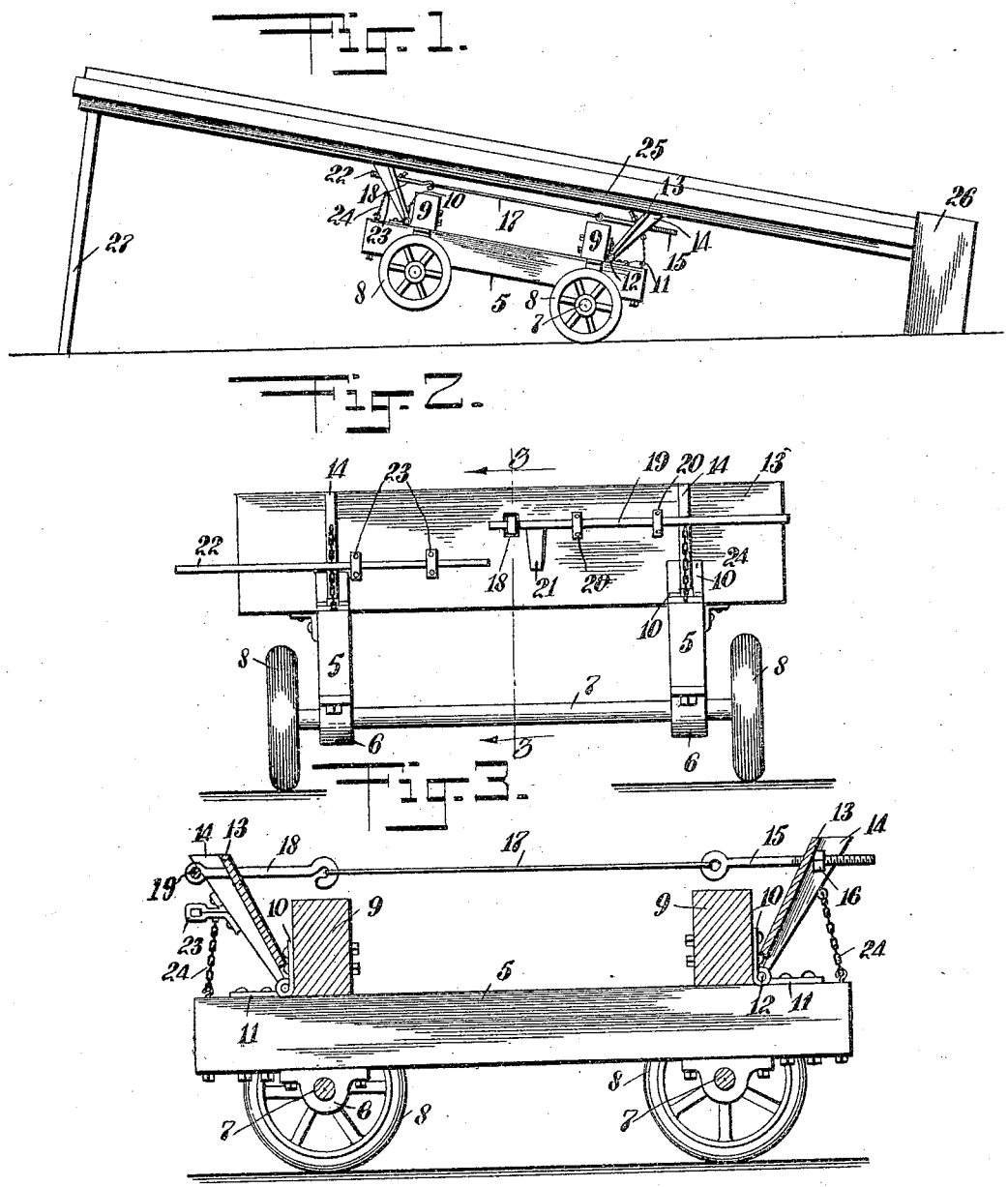

CHRISTIAN J. INGARD, OF SAN FRANCISCO, CALIFORNIA.

TRUCK.

942,563.

Specification of Letters Patent.   Patented Dec. 7, 1909.

Application filed July 24, 1909.   Serial No. 509,391.

*To all whom it may concern:*

Be it known that I, CHRISTIAN J. INGARD, a citizen of the United States, and a resident of San Francisco, in the county of San Francisco and State of California, have invented a new and Improved Truck, of which the following is a full, clear, and exact description.

My invention relates to trucks and it has for its object to provide one which may be used to store lumber on board ship and other places, the truck being so constructed that by lifting one end of the load and depressing the other end the truck with its load may be swung to the desired direction in which the load is to be moved.

Another object of the invention is to provide a truck with hinged load carriers and means to support them, so that when one end of the load is pushed against an abutment and the other end is supported, the means to support the load carriers may be freed, to permit the load carriers to fall, when the truck may be removed from under the load.

Still other objects of the invention will appear in the following complete description in this specification, in which I will describe the preferred form of my invention, it being understood that the scope of the invention is defined in the appended claims.

Reference is to be had to the accompanying drawings forming a part of this specification, in which similar characters of reference indicate corresponding parts in all the views.

Figure 1 is a side elevation of the truck with timber disposed thereon in position for unloading; Fig. 2 is an enlarged end view of the truck; and Fig. 3 is a sectional view on the line 3—3 of Fig. 2.

By referring to the drawings, it will be seen that there are two longitudinal frame members 5 which have bearings 6 secured to their under sides, in which are journaled the axles 7, the wheels 8 being mounted on said axles. To the longitudinal frame members 5 are secured transverse bolster members or abutments 9 which are spaced apart. Hinges 10 are secured to the outer sides of the bolster members or abutments 9, respectively, the leaves 11 of the said hinges being secured to the longitudinal frame members 5, the hinges being four in number, two of which are secured to each of the transverse bolster members 9. There are pintles 12 which engage the leaves 10 and 11, the pintles 12 also being disposed in knuckles on load supporters 13, so that the load supporters 13 are pivoted one at each end of the truck beyond the transverse bolster members 9. These load supporters 13 have right angular flanges 14 which increase their strength. Disposed in an orifice of one of the load carriers 13 is an eye bolt 15, and nut 16 engages the thread of the eye bolt 15 to prevent the eye bolt from becoming disengaged from the load carrier 13. A tie rod 17 is secured to this eye bolt 15 at one terminal, the other terminal of the tie rod 17 engaging the hook in a hook bolt 18, this hook bolt 18 being disposed through an orifice in the other load carrier 13, and having an orifice near its terminal, in which is disposed a bolt 19, the bolt 19 being disposed in guideways 20, there being a depending flange 21 secured to the bolt 19. A second bolt 22 is provided, this bolt 22 being disposed in guideways 23. When the bolt 22 is so disposed, it is in alinement with the depending flange 21, so that when the outer terminal of the bolt 22 is struck by a hammer, the inner terminal will strike the flange 21, and as the flange 21 is secured to the bolt 19, the bolt 19 may in this way be driven from the orifice in the hook bolt 18. Chains 24 are secured to the longitudinal frame members 5 and to the flanges 14 of the load carriers 13, which limit the movement of the load carriers in the direction of the transverse bolster members 9.

In using my invention, it is customary to dispose the lumber 25 on the truck by means of a derrick, the load carriers 13 having previously been adjusted and held together by the tie rod 17 and the bolts 15 and 18. When the lumber 25 is disposed on the truck, it may be readily rolled by one or two men to the desired position provided it is headed in that direction. Should it be desired to swing the truck so that the lumber may be moved in another direction, one of the men presses down on one end of the lumber and the other man presses upwardly on the other end, and in this manner the lumber load is balanced on one axle of the truck, the other two wheels of the truck being raised from the deck of the vessel or ground, when the two men may readily swing the lumber and the truck to the position where it may be moved in the desired direction. The men having moved the lumber and the truck to the position desired, the lumber and the truck are pushed until one end of the lumber 25 strikes against an inclined abutment 26, when the other end of the lumber is lifted and is supported by means of a piece of timber 27. When thus supported one of the workmen strikes the bolt 22 at its outer terminal, with a hammer, which drives the inner terminal of the bolt 22 against the depending flange 21 of the bolt 19, and by this means the bolt 19 is driven from the opening in the hook bolt 18, which frees the hook bolt 18 from the load carrier 13 with which it has been engaged, thereby freeing the upper terminals of the load carriers one from the other. When this is done, the load carriers 13 fall toward the terminals of the longitudinal frame members 5 and away from the under side of the timber 25 which has formed the load. This having been done, the truck may be readily removed from under the lumber 25, and when the timber 27 is knocked down, the lumber 25 will be in the desired position.

Having thus described my invention, I claim as new and desire to secure by Letters Patent:

1. In a truck, a body, two load carriers spaced apart and hinged to the body, the free terminals of the load carriers normally diverging, and means to hold the free terminals of the load carriers at a predetermined distance from each other.

2. In a truck, two longitudinal members spaced apart, two sets of bearings secured to the longitudinal members, axles journaled in the bearings, wheels mounted on the axles, transverse bolster members secured to the top of the longitudinal members, two load carriers spaced apart and hinged to the body formed by the longitudinal members and the transverse bolster members, and detachable means adapted for holding the free terminals of the load carriers at a predetermined distance from each other.

3. In a truck, a body, two load carriers normally supported obliquely on the body at different angles relatively to the body, and detachable means for holding the free terminals of the load carriers at a predetermined distance from each other.

4. In a truck, a body having two transverse bolster members spaced apart, two load carriers mounted on the body, one at the outer side of each of the bolster members, one of the load carriers being adapted to move relatively to the other, and disengageable means adapted for holding the load carriers at a predetermined distance from each other.

5. In a truck, a body having two transverse bolster members spaced apart, two load carriers hinged to the body, one at the outer side of each of the bolster members, and disengageable means for holding the load carriers at a predetermined distance from each other.

6. In a truck, a body having abutments spaced apart, two load carriers each having one of its terminals disposed against one of the abutments, and disengageable means adapted for holding the other terminals of the load carriers at a predetermined distance from each other.

7. In a truck, a body having two abutments spaced apart, two load carriers, each having one of its terminals disposed against one of the abutments, disengageable means adapted for holding the other terminals of the load carriers at a predetermined distance from each other, and means limiting the movement of the load carriers toward each other.

8. In a truck, a body having two abutments, two load carriers each having a terminal disposed against one of the abutments, a tie member which is disposed through orifices in the load carriers respectively, means to prevent the withdrawal of the tie member from the orifice in one of the load carriers, a guideway on the other load carrier, there being an opening in the tie member near its terminal disposed through the last-mentioned load carrier, and a bolt mounted to slide in the guideway adapted to be inserted in the said opening in the tie member.

9. In a truck, a body having two transverse bolster members spaced apart, two load carriers hinged to the body at the outer side of the transverse bolster members, a tie member which is disposed through orifices in the load carriers respectively, means to prevent the withdrawal from the orifice in one of the load carriers, a guideway mounted on the other load carrier, there being an opening in the tie member near its terminal disposed through the last-mentioned load carrier, and a bolt mounted to slide in the guideway adapted to be inserted in the opening of the tie member.

10. In a truck, a body having two abutments, two load carriers each having a terminal disposed against one of the abutments, a tie member which is disposed through orifices in the load carriers, means to prevent the withdrawal of the tie member from the orifice in one of the load carriers, a guideway mounted on the other load carrier, there being an opening in the end of the tie member which is disposed through the orifice in the last-mentioned carrier, a bolt mounted to slide in the guideway adapted to be inserted in the opening in the tie member, a flange secured to the bolt, a second guideway secured to the last-mentioned load carrier, a second bolt disposed in the last-mentioned guideway, the second bolt being adapted to contact with the flange so that when hit by a hammer it will move the first-mentioned bolt.

11. In a truck, a body having two abutments, two load carriers each having a terminal disposed against one of the abutments, a tie member which is disposed through orifices in the load carriers respectively, means to prevent the withdrawal of the tie member from the orifice in one of the load carriers, a guideway mounted on the other load carrier, there being an opening in the tie member, a bolt mounted to slide in the guideway adapted to be inserted in the opening of the tie member, and means for withdrawing the bolt from the opening in the tie member.

In testimony whereof I have signed my name to this specification in the presence of two subscribing witnesses.

CHRISTIAN J. INGARD.

Witnesses:
ZOE HARRISON,
WILMA CATTERMOLE.